Jan. 9, 1934. T. B. NISBET Re. 19,044
WING SHIELD SUPPORT
Original Filed Dec. 17, 1927 2 Sheets-Sheet 1
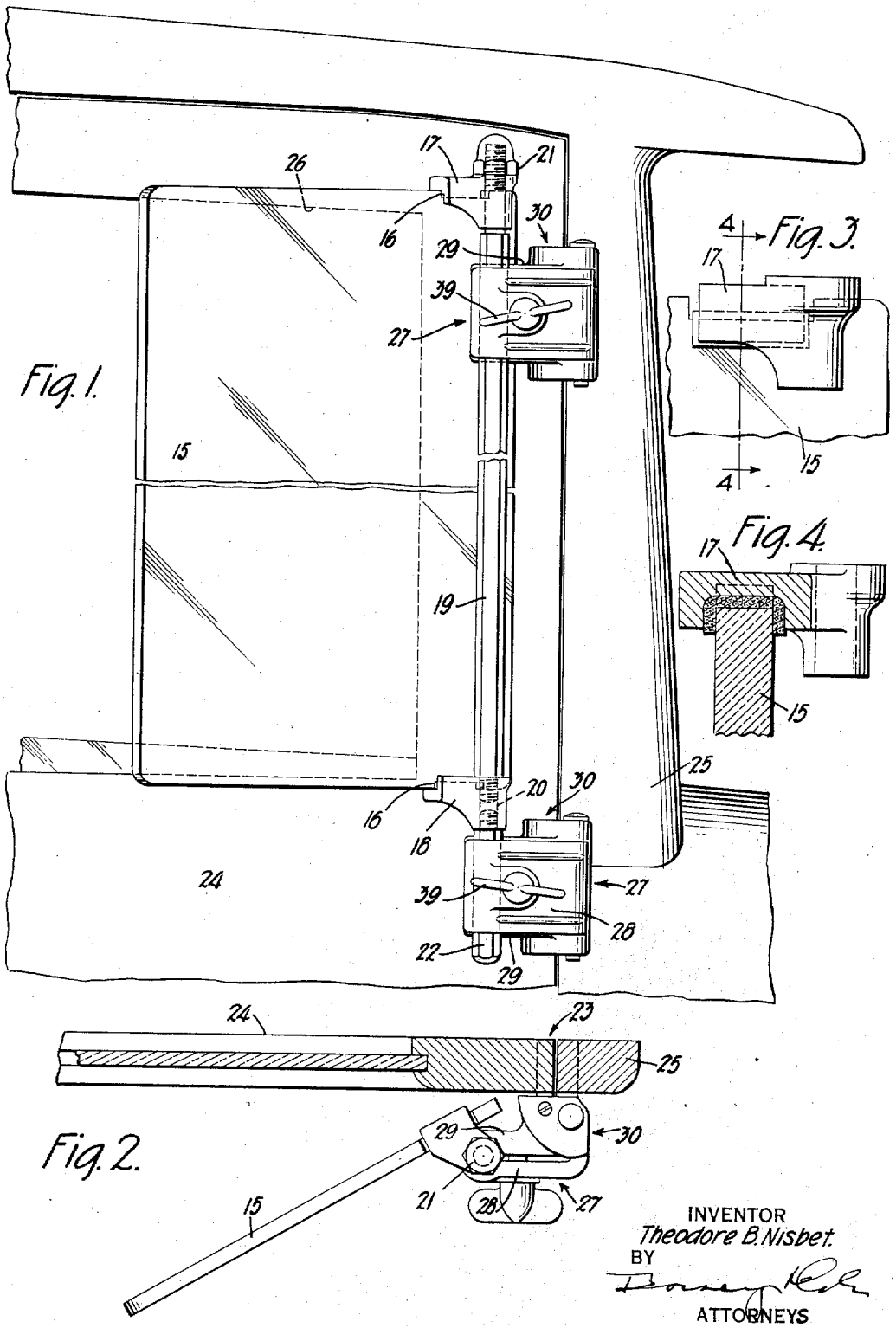
INVENTOR
Theodore B. Nisbet.
BY
ATTORNEYS Jan. 9, 1934. T. B. NISBET Re. 19,044

WING SHIELD SUPPORT

Original Filed Dec. 17, 1927 2 Sheets-Sheet 2

INVENTOR
Theodore B. Nisbet.
BY
ATTORNEYS

Reissued Jan. 9, 1934

Re. 19,044

UNITED STATES PATENT OFFICE 19,044

WING SHIELD SUPPORT

Theodore B. Nisbet, Irvington-on-Hudson, N. Y., assignor to Edward T. Condon, New York, N. Y.

Original No. 1,805,341, dated May 12, 1931, Serial No. 240,772, December 17, 1927. Application for reissue June 23, 1932. Serial No. 618,994

27 Claims. (Cl. 296—84)

This invention relates to means for supporting shields on passenger-carrying bodies, such as the bodies of automobiles, and more particularly to means adapted for use in supporting a shield, such as a wing shield, adjacent a window in a door pivoted at its forward edge.

In order to provide suitable protection at a window, a wing shield must have its inner edge close to the forward edge of the window opening. Also the wing shield must be so supported that it will not interfere with the movement of the door. Such interference may be avoided by supporting the wing shields in such manner as to swing with the doors with which they are associated.

Heretofore it has been proposed to attach the wing shields to the doors by screws entering the doors at their outer surfaces. This would, however, mar the surfaces of the doors and, if for any reason the wing shields were removed, the doors would present a marred appearance. Also, other difficulties might arise.

An important object of this invention is to provide simple and efficient means for supporting a shield, such as an air deflector on an automobile body, to swing with a door and attachable to the car without marring the door or other parts of the body or without deformation of the exterior door structure, the shield supporting means being disposed spaced outwardly and forwardly of the opening of the window, the front edge of the shield being substantially in register with the front post of the door, or disposed spaced forwardly of the front edge of the glass window, thereby to leave the glass window unobstructed for clear vision, and to enable the glass of the window to be completely accessible for cleaning on its outer face.

According to some forms of carrying out the invention, the shields may be attached to the door hinges so as to swing with the parts of the hinges secured directly to the doors. This may be done by providing attaching devices with openings to receive pintles or pins forming parts of the hinges and having means to secure the attaching devices in fixed relation to the hinge leaves which are attached to the doors. According to other forms of the invention, the wing shields may be attached, without use of such pins or pintles, to the usual hinge leaves secured to the edges of the doors and in still other cases the usual hinge leaves attached to the doors may be replaced by special forms especially adapted for the purpose. The invention also contemplates the use of attaching devices which may be secured to the edges of the doors adjacent the hinges.

Other features and advantages will appear upon consideration of the following description and the drawings in which:

Fig. 1 is a fragmentary side elevation illustrating one embodiment of my invention;

Fig. 2 is a sectional view taken along a horizontal plane, the shield and supporting means being viewed from above;

Fig. 3 is a detail view illustrating a clamping member applied to a wing shield;

Fig. 4 is a sectional view taken along the line 4—4 of Fig. 3;

Figure 5:
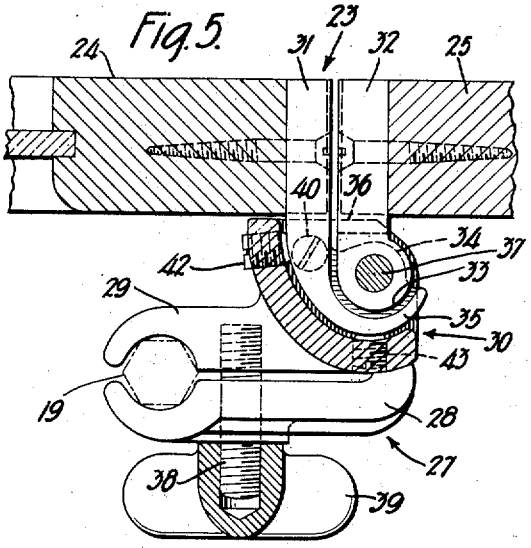
Fig. 5 is a fragmentary top plane view, partly in section, illustrating details of structure.

Referring to the drawings 15 designates a shield, here shown as a wing shield in the form of a glass plate having at its upper and lower edges notches 16 into which project parts of clamping members or brackets 17 and 18, respectively. These brackets 17 and 18 are also grooved to receive adjacent portions of the wing shield and are pressed together by means including an elongated rod 19, here shown as hexagonal in cross section and having its lower end reduced and threaded tightly into a bore 20 in bracket 18 and its reduced upper end passing through the bracket 17 and threaded into a nut 21 by which the desired pressure of the brackets 17 and 18 on the shield 15 may be produced or varied. Preferably the grooves of the brackets 17 and 18 are lined with cushioning material, such as felt or rubber as indicated in Fig. 4. To provide what is substantially an extension of the hexagonal rod 19 below the bracket 18, a short rod 22 of substantially the same cross section as rod 19 may be secured in alignment therewith by screwing the reduced and threaded upper end of the short rod 22 into the lower end of the bore 20.

The shield and attachments just described are particularly adapted for support on hinges 23 by which a door 24 is attached to a body 25 of a closed car. Usually there are three hinges for each door and the upper hinge and middle hinge are arranged as shown in Fig. 1, the upper hinge being slightly below the upper edge of window 26 in the door and the middle hinge being somewhat lower than the lower edge of the window opening. Obviously, the upper edge of the shield should extend slightly above the upper edge of the window and the lower edge of the shield should extend slightly below the lower edge of the window. If the shield were made of sufficient length to extend below the middle hinge, the rod 19 would be of sufficient length to be engaged by clamps projecting from the upper hinge and the middle hinge. It is desirable, however, both for appearance and economy of material, that the shield be just of sufficient height, from its lower to its upper edge to afford proper protection at the window. One way of meeting the requirement for clamping at points farther apart than the length of the shield consists in providing said extension 22 of the rod 19.

The connection between the shield 15 and the hinges 23 may include means such as clamps 27, each of which includes a clamping member 28 and a clamping member 29, the latter being formed with a device or socket portion 30 for attachment with a hinge 23. As shown in Figs. 1, 2, 5 and 6, each device 30 is formed to fit over a hinge member 31 attached to the door. The hinges shown are of a form in general use and each hinge comprises in addition to a door leaf 31, a leaf 32 for attachment to the body 25, the leaf 32 having at its outer end spaced ears 33 with aligned bores and the leaf 31 being formed at its outer end with a lug 34 fitting between the ears of the leaf 32 and perforated to received a pin passed through the aligned bore in said ears. The leaf 31 is also provided with a portion 35 extended or curved around the outer end of the leaf 32. The attaching device 30 is formed with an inner surface corresponding to the outer surface of the outer end of the leaf 31 and with upper and lower flanges 36 which overlie the upper and lower edges of the hinge and are perforated to receive a hinge pin 37 which may be of greater length than those in ordinary use with such hinge leaves. As indicated in Fig. 5, the clamping effect of the members 28 and 29 may be obtained by a threaded pin secured in the clamp member 29 and projecting through the clamp member 28 to provide a portion on which is mounted a nut 39, conveniently in the form of a wing nut.

The hinge pins 37 furnish a strong connection between the devices 30 and the hinges 23 but this connection may not be sufficient to prevent relative movement between the device 30 and the adjacent hinge leaf about the axis of the hinge pin 37. Prevention of such relative movement may be effected as follows: Set screws 40 may be inserted in threaded openings 41 in the upper and lower flanges 36 and forced into close engagement with the upper and lower edges of the hinge leaf 31. Under some conditions it might be sufficient to use only one screw 40. The same general effect may be obtained by screws 42 and 43 threaded through the device 30 to engage the leaf 31 close to the frame of the door and also at the extended portion 35.

It is of great importance to be able to apply such a shield to a car for demonstration purposes without marring the finish of the car in such a manner as to be conspicuous when the shield is removed. In using the devices just described the only parts likely to be marred are the hinges and to avoid such marring the parts or devices 30 may be constructed so that, when positioned to receive the hinge pins 37, there is a space between each part 30 and hinge leaf 31 to permit the insertion of a thin sheet of suitable material such as felt or rubber to be engaged by the set screws 42 and 43 and pressed against the leaf 31. Similarly, suitable protecting material may be inserted between the set screws 40 and the upper and lower edges of the leaf 31.

According to the form of the invention just described, all that is necessary in order to apply a wing shield to a car is to apply devices 30 to the upper and middle hinges at one side of a car and then attach the wing shield by inserting the hexagonal rod 19 of a wing shield into the upper clamp 27 and the extension 22 into the lower clamp and by tightening the wing nuts 39 after adjusting the shield at the desired elevation.

Figure 7:
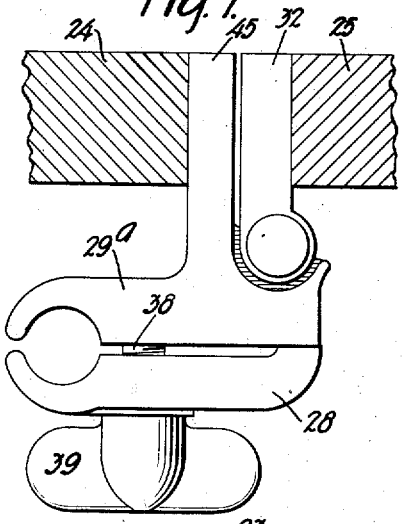
Fig. 7 is a view illustrating a modified form of the invention in which a hinge leaf attached to a door is modified in form.
Figure 6:
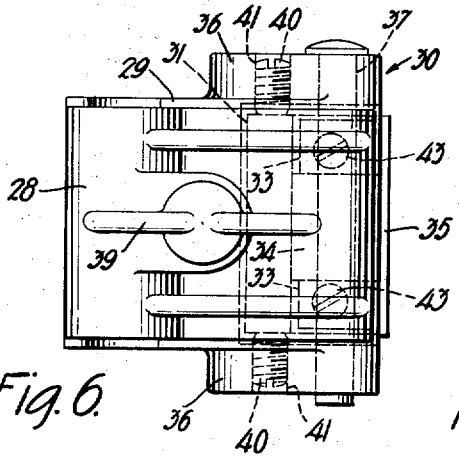
Fig. 6 is a view in elevation illustrating an attaching device applied to a hinge.

According to the embodiment of the invention illustrated in Fig. 7, use may be made of a hinge leaf 45 for attachment to the hinge edge of a door and having a clamp member 29*a* integral therewith. These hinge leaves 45 may be parts of the hinges furnished with the car or may be substituted for the door leaves of the hinges supplied with the car. The rest of the clamp may include an outer clamp member 28, a threaded pin 38 passing through the clamp member and secured in said clamp member 29*a*, and a wing nut threaded on the outer end of said pin 38.

Figure 8:
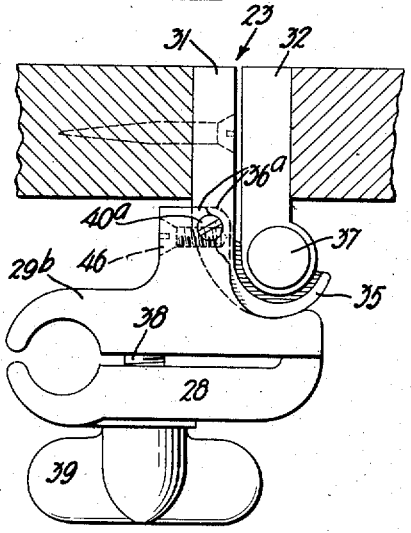
Fig. 8 is a view illustrating a third form of the invention.

According to a third form of the invention illustrated in Fig. 8, the attachment consists of a clamp member 28 which may be pressed by a wing nut on a pin 38, against a clamp member 29*b* formed with a part to fit around the curved outer end of a leaf 31 and having flanges 36*a* above and below the upper and lower edges, respectively, of the hinge leaf 31 adjacent the door 24. The clamp member 29*b* may be secured to the leaf 31 by one or more screws 46 passing through an inward extension of the clamp member 29*b* and threaded into the hinge leaf 31, or by means including a screw 40*a* passing through a flange 36*a*, or by both.

Figure 9:
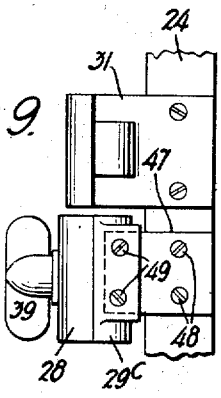
Fig. 9 is a view illustrating a fourth form of the invention.

According to the embodiment of the invention illustrated in Fig. 9 a plate 47 is permanently attached to the hinged edge of a door 24 by screws 48 at any point adjacent a hinge, the plate 47 being here shown as beneath the hinge leaf, and the clamp includes a clamp member 29*c* adapted to be secured to plate 47 by suitable means such as screws 49.

Figure 10:
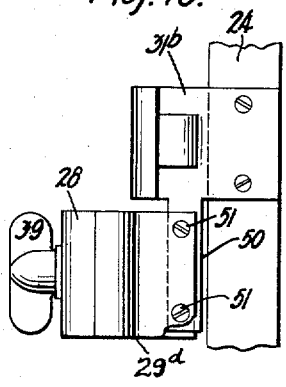
Fig. 10 is a view illustrating a fifth form of the invention.

According to a fifth embodiment of the invention illustrated in Fig. 10, use is made of a hinge leaf 31*b* attached to a door and provided with an integral extension 50 to which may be secured by screws 51 a clamp member 29*d* forming part of a clamp which may otherwise be of any suitable form.

Figure 11:
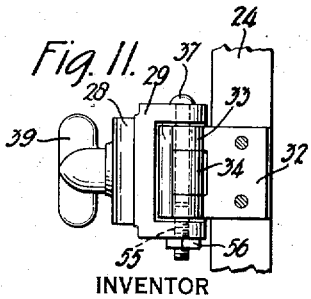
Fig. 11 is a view illustrating a clamp device adapted for attachment by use of a hinge pin of usual length.

As illustrated in Figure 11, a hinge attachment of the general form shown in Figures 1 to 6, inclusive, may be held in place by a hinge pin 37 of the length ordinarily used with the hinge leaves in connection with a member or stud 55 threaded through the lower flange of the attachment to enter the lower end of the hinge bore left vacant due to the raised position of the hinge pin. The member or stud 55 may be held in adjusted position by means of a lock nut 56.

In all forms of the invention the bracket constituting the shield supporting means is disposed spaced outwardly and forwardly of the window opening, the front edge of the shield being substantially in register with the front post of the door, or disposed spaced forwardly of the front edge of the glass window, thereby to leave the glass window unobstructed for clear vision, and to enable the glass of the window to be completely accessible for cleaning on its outer face.

The foregoing detailed description has been given for clearness of understanding and no undue limitation should be deduced therefrom, but the appended claims should be construed as broadly as possible in view of the prior art.

Having thus described my invention, I claim:

1. The combination with a passenger-carrying body, a door therein having a window, and two hinges, one leaf of each hinge being attached to the door at its edge and the other leaf being attached to said body, of a shield for said window and means for so attaching said shield to said hinges as to turn with said door.

2. The combination with a passenger-carrying body, a door therein having a window, and two hinges, one leaf of each hinge being attached to the door at its edge and the other leaf being attached to said body, of a shield for said window and means for supporting said shield to turn with said door including devices adapted to be secured to and supported by the hinge leaves attached to the edge of the door.

3. The combination with a car body having a door with a window therein and two hinges, one leaf of each of which is attached to an edge of the door and the other to the body at an edge adjacent the edge of the door, of a shield for said window and means for supporting said shield to swing with said door including a device having a portion overlying the top of one of said hinges, and means for securing said device to the hinge leaf attached to the door.

4. The combination with a car body having a door provided with a window, and two hinges, one leaf of each hinge being attached to the edge of the door and the other to the body of a shield for said window, and means for supporting said shield on said hinges including a device adapted to overlap the said hinge and to receive the hinge pin, and screw means to prevent swinging movement between said device and the hinge leaf attached to said door.

5. The combination with a car body having a door with a window therein and two sets of hinge leaves, one leaf of each set being attached to an edge of the door and the other leaf of each set being attached to the body, of a shield for said window and means for supporting said shield on said hinge leaves including for each set of hinge leaves a hinge pin, a shield-supporting device attachable to the hinge leaves by said pin and screws threaded in said device and coacting with the leaf attached to the door, to prevent relative movement between said leaf and the device.

6. The combination with a car body having a door with a window therein and two sets of hinge leaves, one leaf of each set being attached to an edge of the door and the other leaf being attached to the body, of a shield for said window and means for supporting said shield on said hinge leaves including for each set of hinge leaves a hinge pin, a device to fit over the leaf on the door and having portions overlapping such leaf at the top and bottom and perforated to receive said hinge pins when passed through the hinge leaves and having threaded openings adjacent the upper and lower edges of the leaf attached to the door, and screws threaded into said openings.

7. The combination with a car body having a door with a window therein and two sets of hinge leaves adapted to be connected by hinge pins, one leaf of each set being attached to the body and the other being attached to an edge of the door and being extended around the outer end of the other leaf, of a shield for said window and means for supporting said shield on said hinge leaves including for each set of hinge leaves a hinge pin, a device to extend around the ordinarily exposed outer face of the leaf attached to the door and having perforated portions at the top and bottom adapted to receive said hinge pin, and screws threaded through said device to engage the outer surface of the extended portion of such leaf at points so spaced angularly around said pin as to prevent relative rotation of such device with reference to such leaf about the axis of the pin.

8. The combination with a car body having a door with a window therein, of a shield for said window, attaching members secured to said shield, hinges comprising leaves attached to said body and leaves attached to the edge of said door, each of the last mentioned leaves being adapted for connection with said attaching members, and means including screws for securing together said attaching members and said hinge leaves adapted for connection therewith.

9. The combination with a car body having a door with a window therein and hinges with leaves attached to the body and leaves attached to the edge of the door, of a shield for said window, means for supporting said shield including clamps permitting vertical adjustment of the shield, clamp-supporting devices attachable to said hinges, and means for securing said clamp-supporting devices to said hinges to swing with the hinge leaves attached to said door.

10. The combination with a car body having a door therein and two sets of hinge leaves, one leaf of each set being attached to an edge of the door and the other leaf being attached to the body and means for supporting a wing shield including for one set of said hinge leaves a hinge pin, a device to fit over the leaf on the door and having portions overlapping such leaf at the top and bottom and provided with aligned perforations of which the upper receives the portion of the hinge pin above the hinge leaves, a member projecting upwardly through the perforation in the lower overlapping portion in alignment with the hinge pin and means for securing said member in adjusted position.

11. The combination with a car body having a door therein and two sets of hinge leaves, one leaf of each set being attached to an edge of the door and the other leaf being attached to the body and means for supporting a wing shield including for one set of said hinge leaves a hinge pin, a device to fit over the leaf on the door and having portions overlapping such leaf at the top and bottom and provided with aligned perforations of which the upper receives the portion of the hinge pin above the hinge leaves, a member having screw threaded engagement in the perforation of the lower overlapping portion in alignment with said hinge pin, and a lock nut for securing said member in adjusted position.

12. A wing shield for use with a passenger-carrying body, having a door provided with a window, and two hinges, one leaf of each hinge attached to the door at its edge and the other leaf attached to said body, including a shield element for said window and means for so attaching said shield element to said hinges so as to turn with said door.

13. A wing shield for use with a passenger-carrying body, having a door provided with a window, and two hinges, one leaf of each hinge attached to the door at its edge and the other leaf attached to said body, including a shield element for said window and means for supporting said shield element to turn with said door including devices having means to be secured to and supported by the hinge leaves attached to the edge of the door.

14. A wing shield for use with a car body having a door provided with a window and two hinges, one leaf of each of which is attached to an edge of the door and the other to the body at an edge adjacent the edge of the door, including a shield element for said window and means for supporting said shield element to swing with said door including a device having a portion overlying the top of one of said hinges, and means for securing said device to the hinge leaf attached to the door.

15. A wing shield for use with a car body having a door provided with a window, and two hinges, one leaf of each hinge attached to the edge of the door and the other to the body, including a shield element for said window, and means for supporting said shield element on said hinges including a device having means to overlap the said hinge to receive the hinge pin, and screw means to prevent swinging movement between said device and the hinge leaf attached to said door.

16. A wing shield for use with a car body having a door provided with a window and two sets of hinge leaves, one leaf of each set attached to an edge of the door and the other leaf of each set attached to the body, including a shield element for said window and means for supporting said shield element on said hinge leaves including for each set of hinge leaves a hinge pin, a shield-supporting device attachable to the hinge leaves by said pin, and screws threaded in said device and coacting with the leaf attached to the door, to prevent relative movement between said leaf and the device.

17. A wing shield for use with a car body having a door provided with a window and two sets of hinge leaves, one leaf of each set attached to an edge of the door and the other leaf attached to the body, including a shield element for said window and means for supporting said shield element on said hinge leaves including for each set of hinge leaves a hinge pin, a device to fit over the leaf on the door and having portions overlapping such leaf at the top and bottom and perforated to receive said hinge pins when passed through the hinge leaves and having threaded openings adjacent the upper and lower edges of the leaf attached to the door, and screws threaded into said openings.

18. A wing shield for use with a car body having a door provided with a window and two sets of hinge leaves connected by hinge pins, one leaf of each set attached to the body and the other attached to an edge of the door and being extended around the outer end of the other leaf, including a shield element for said window and means for supporting said shield element on said hinge leaves including for each set of hinge leaves a hinge pin, a device to extend around the ordinarily exposed outer face of the leaf attached to the door and having perforated portions at the top and bottom adapted to receive said hinge pin, and screws threaded through said device to engage the outer surface of the extended portion of such leaf at points so spaced angularly around said pin as to prevent relative rotation of such device with reference to such leaf about the axis of the pin.

19. A wing shield for use with a car body having a door provided with a window and hinges comprising leaves attached to said body and leaves attached to the edge of said door, including a shield element for said window, attaching members secured to said shield element, and having means to engage each of the last mentioned leaves, and means including screws for securing together said attaching members and said hinge leaves adapted for connection therewith.

20. A wing shield for use with a car body having a door provided with a window and hinges with leaves attached to the body and leaves attached to the edge of the door, including a shield element for said window, means for supporting said shield element including clamps permitting vertical adjustment of the shield, clamp-supporting devices attachable to said hinges, and means for securing said clamp-supporting devices to said hinges to swing with the hinge leaves attached to said door.

21. A wing shield for use with a car body having a door and two sets of hinge leaves, one leaf of each set attached to an edge of the door and the other leaf attached to the body, comprising a shield element and means for supporting the shield element including for one set of said hinge leaves a hinge pin, a device to fit over the leaf on the door and having portions overlapping such leaf at the top and bottom and provided with aligned perforations of which the upper receives the portion of the hinge pin above the hinge leaves, a member projecting upwardly through the perforation in the lower overlapping portion in alignment with the hinge pin and means for securing said member in adjusted position.

22. A wing shield for use with a car body having a door therein and two sets of hinge leaves, one leaf of each set attached to an edge of the door and the other leaf attached to the body, comprising a shield element and means for supporting the element including for one set of said hinge leaves a hinge pin, a device to fit over the leaf on the door and having portions overlapping such leaf at the top and bottom and provided with aligned perforations of which the upper receives the portion of the hinge pin above the hinge leaves, a member having screw threaded engagement in the perforation of the lower overlapping portion in alignment with said hinge pin, and a lock nut for securing said member in adjusted position.

23. A wing shield for use with a passenger carrying body having a hinged door provided with a window including a shield element, and means for connecting the shield element to the hinges so as to cause the shield element to swing with the door.

24. A glass shield for exterior use with automobiles of the closed type, including a shield element for the window of the door of the automobile, and means to attach the element to the hinges of and for movement with the door of the automobile and with the element disposed wholly outwardly of the door frame and forwardly of the glass window opening to leave the glass window unobstructed for clear vision and completely accessible for cleaning on its outer face.

25. A glass wing shield for use with an automobile having a hinged door provided with a glass window, including supporting means for the shield, means to secure the supporting means to the front post of the door to swing therewith and at a point so as to leave the glass window unobstructed for clear vision, and means to pivotally connect the shield to the supporting means and with the point of connection located forwardly of the window opening so that the glass window is rendered completely accessible for cleaning on its outer face.

26. A wing shield for use exteriorly of an automobile having a glass window and a post-like member for slidably supporting the front edge of the glass window, including supporting means for the shield, means to secure the supporting means to said post-like member so as to leave the glass window unobstructed for clear vision both forwardly and laterally in all positions of the sliding glass window, and means to pivotally connect the shield to the supporting means and with the pivotal point located outwardly and forwardly of the window opening and with the front edge of the shield disposed in proximity to the post-like member so that the glass window is rendered completely accessible for cleaning on its outer face and with the pivotal point disposed substantially out of the line of vision in the normal operating position of an operator inwardly of the glass window.

27. A wing shield for use exteriorly of an automobile having a glass window and a post-like member for slidably supporting the front edge of the glass window, including supporting means for the shield, means to secure the supporting means to said post-like member so as to leave the glass window unobstructed for clear vision both forwardly and laterally in all positions of the sliding glass window, and means to connect the shield to the supporting means and with the point of connection located outwardly and forwardly of the window opening and with the front edge of the shield disposed in proximity to the post-like member so that the glass window is rendered completely accessible for cleaning on its outer face and with the point of connection disposed substantially out of the line of vision in the normal operating position of an operator inwardly of the glass window.

THEODORE B. NISBET.